(12) United States Patent
Jinzhao

(10) Patent No.: US 9,414,713 B2
(45) Date of Patent: Aug. 16, 2016

(54) ELECTRIC WAFFLE MAKER OR STEAK GRILL

(75) Inventor: Feng Jinzhao, Foshan (CN)

(73) Assignee: Nomura USA, Inc., Grand Prairie, TX (US)

( * ) Notice: Subject to any disclaimer, the term of this patent is extended or adjusted under 35 U.S.C. 154(b) by 286 days.

(21) Appl. No.: 14/240,411

(22) PCT Filed: Nov. 22, 2011

(86) PCT No.: PCT/CN2011/082582
§ 371 (c)(1),
(2), (4) Date: Feb. 24, 2014

(87) PCT Pub. No.: WO2013/029313
PCT Pub. Date: Mar. 7, 2013

(65) Prior Publication Data

US 2015/0164274 A1 Jun. 18, 2015

(30) Foreign Application Priority Data

Sep. 2, 2011 (CN) .......................... 2011 1 0258225

(51) Int. Cl.
*A47J 37/06* (2006.01)
*A47J 37/01* (2006.01)

(52) U.S. Cl.
CPC ............ *A47J 37/0611* (2013.01); *A47J 37/015* (2013.01); *A47J 2037/0617* (2013.01)

(58) Field of Classification Search
CPC ...................... A47J 37/0611; A47J 2037/0617
USPC .................... 99/376, 377, 372, 374, 375, 378
See application file for complete search history.

(56) References Cited

U.S. PATENT DOCUMENTS

| | | | | |
|---|---|---|---|---|
| 2,496,705 A * | 2/1950 | Farr | .................... | A47J 37/0611 99/376 |
| 2,784,663 A * | 3/1957 | Rand | .................... | A47J 37/0611 99/376 |
| 6,433,312 B1 | 8/2002 | Chen | | |
| 2004/0217109 A1 | 11/2004 | Chang | | |
| 2006/0201333 A1* | 9/2006 | Friel, Sr. | ............. | A47J 37/0611 99/372 |

FOREIGN PATENT DOCUMENTS

| | | |
|---|---|---|
| CN | 1765271 A | 5/2006 |
| CN | 201595702 U | 10/2010 |

(Continued)

*Primary Examiner* — Reginald L Alexander
(74) *Attorney, Agent, or Firm* — Mark D. Perdue

(57) ABSTRACT

An electric scone machine or steak machine comprises hinge-connected upper and lower bakeware bodies (1, 2). The upper and lower bakeware bodies (1, 2) consist of upper and lower metal housings (101, 201) and upper and lower heating plates (102, 202). The upper and lower heating plates (102, 202) are correspondingly mounted in the upper and lower metal housings (101, 201), and are formed in a manner that baking hot surfaces (102-1, 202-1) of the upper and lower heating plates (102, 202) are opposite to each other when closed. Nonmetallic disk-shaped upper and lower heat insulating housings (103, 203) are disposed between the upper metal housing (101) and the upper heating plate (102) and between the lower metal housing (201) and the lower heating plate (202) respectively. The upper and lower heating plates (102, 202) are embedded in cavities (103-1, 203-1) of the upper and lower heat insulating housings (103, 203) respectively, and have opening edges (102-2, 202-2) borne on support surfaces (103-2a, 203-2a) of extended support platforms (103-2, 203-2) of openings of the upper and lower heat insulating housings (103, 203). Opening edges (101-1, 201-1) of the upper and lower metal housings (101, 201) abut against another end surfaces (103-2b, 203-2b) opposite to the support surfaces (103-2a, 203-2a) of the extended support platforms (103-2, 203-2). Outer end surfaces (103-2c, 203-2c) of the extended support platforms (103-2, 203-2) extend out of outer sides of outer end surfaces (101-2, 201-2, 102-3, 202-3) of the upper and lower metal housings (101, 201) and the upper and lower heating plates (102, 202). The electric scone machine or steak machine of this structure has a simple and reasonable structure, and has the desirable heat insulating effect.

33 Claims, 7 Drawing Sheets

(56) References Cited

FOREIGN PATENT DOCUMENTS

| CN | 201646187 U | | 11/2010 | |
| CN | 102048460 A | | 5/2011 | |
| CN | 201595701 U | | 10/2012 | |
| DE | 2335872 A | * | 9/1974 | .......... A47J 37/0611 |
| DE | 4031218 A | * | 4/1992 | .......... A47J 37/0611 |
| EP | 1400193 A | | 3/2004 | |

* cited by examiner

ELECTRIC WAFFLE MAKER OR STEAK GRILL

FIELD OF THE INVENTION

The present invention relates to an electric waffle maker or steak grill, in particular reducing heating of the metal shell.

BACKGROUND

Existing electric waffle makers or steak grills are susceptible to radiating heat from the cooking surfaces to the exterior housing or casing, thus causing a burn risk to the user. Economical constructions of such appliances that adequately insulate the heated cooking surfaces from heat transfer to the exterior casing and components are desirable.

SUMMARY OF THE INVENTION

The purpose of the present invention is to solve the deficiencies of the prior art, while providing a simple and economical structure, good insulation, safety, and meeting the European GS standards 603335-2-9 (A13 of character plus EK1) temperature requirements for such appliances.

This and other purposes and objects of the invention are achieved with a steak or sandwich grill An electric waffle maker or steak grill that comprises upper and lower bodies connected by a hinge and movable between open and closed positions, each of the bodies having an outermost periphery. Upper and lower nonmetallic heat-insulating casings are received in cavities in the upper and lower bodies, respectively. Each of the heat-insulating casings has an outwardly turned lip that extends outwardly beyond the outermost periphery of each of the bodies. Upper and lower heating plates are carried in the upper and lower heat-insulating casings, respectively, wherein the upper and lower heating plates oppose one another in the closed position. Each of the heating plates has a peripheral edge supported by the outwardly turned lip on each of the heat-insulating casings, the peripheral edge of each heating plate being inward of the outermost periphery of each body.

According to a preferred embodiment of the invention, a plurality of support ribs are arranged around the peripheral edges of each of the heating plates, the support ribs maintaining the peripheral edges of the heating plates and the outwardly turned lips of the heat-insulating casings in a spaced-apart relation, wherein a first cooling gap is defined between each of the heat-insulating casings and each of the heating plates.

According to a preferred embodiment of the invention, a plurality of second support ribs are arranged about the outwardly turned lips of each of the heat-insulating casings, the second support ribs maintain each of the heat-insulating casing in a spaced-apart relation with the outermost periphery of each of the bodies, wherein a second cooling gap is defined between each of the heat-insulating casings and each of the bodies.

According to a preferred embodiment of the invention, the heat-insulating casing is integrally formed of bakelite, plastic or ceramic material.

According to a preferred embodiment of the invention, each of the upper and lower bodies, heat-insulating casings, and heating plates are generally circular and the outer diameter of the heat-insulating casings exceeds that of the heating plates by approximately 5 mm.

According to a preferred embodiment of the invention, a distance A between the outwardly turned lips of the upper and lower heat-insulating casings in the closed position is about 8-10 mm.

According to a preferred embodiment of the invention the upper and lower heating plates are integrally formed of aluminum or copper.

According to a preferred embodiment of the invention, upper and lower fiber insulation pads are arranged between the heating plates and insulating casings, respectively.

According to a preferred embodiment of the invention, at least one mounting column extends from each of the heating plates and at least one positioning sleeve holes are formed through each of the heat-insulating casings in a location corresponding to that of the mounting column, wherein, upon assembly, the mounting column extends through the positioning sleeve holes.

Other objects, purposes, features, and advantages of the invention will become apparent with reference to the drawings and the detailed description, which follow.

DETAILED DESCRIPTION OF THE INVENTION

Figure 1:
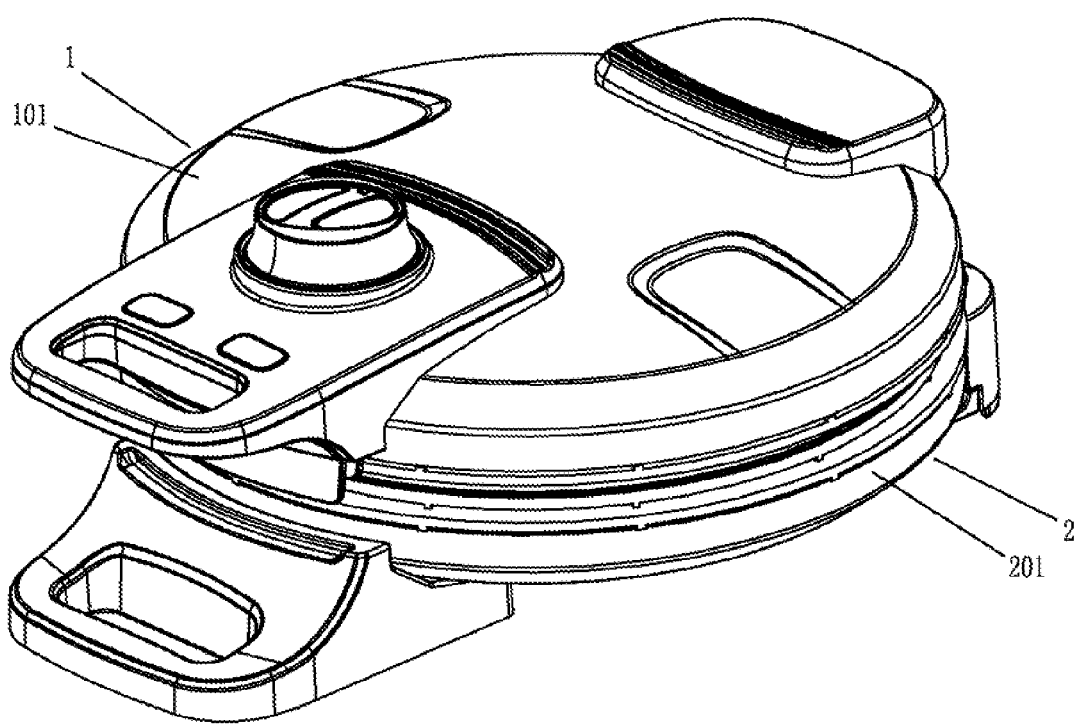
FIG. 1 is a perspective view of the steak grill or waffle maker according to the present invention in closed position.
Figure 2:
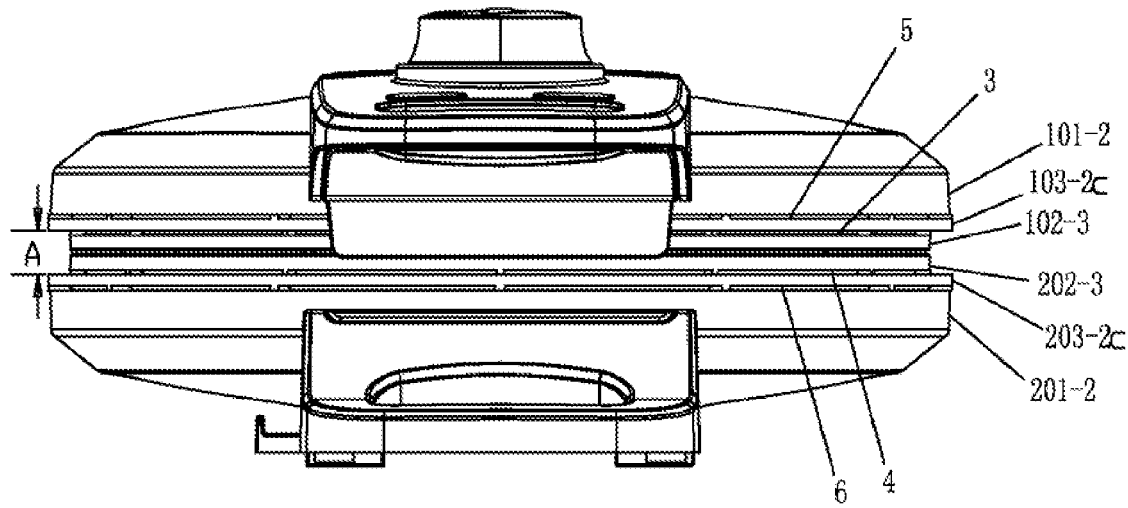
FIG. 2 is a front elevation view of the apparatus of FIG. 1.
Figure 3:
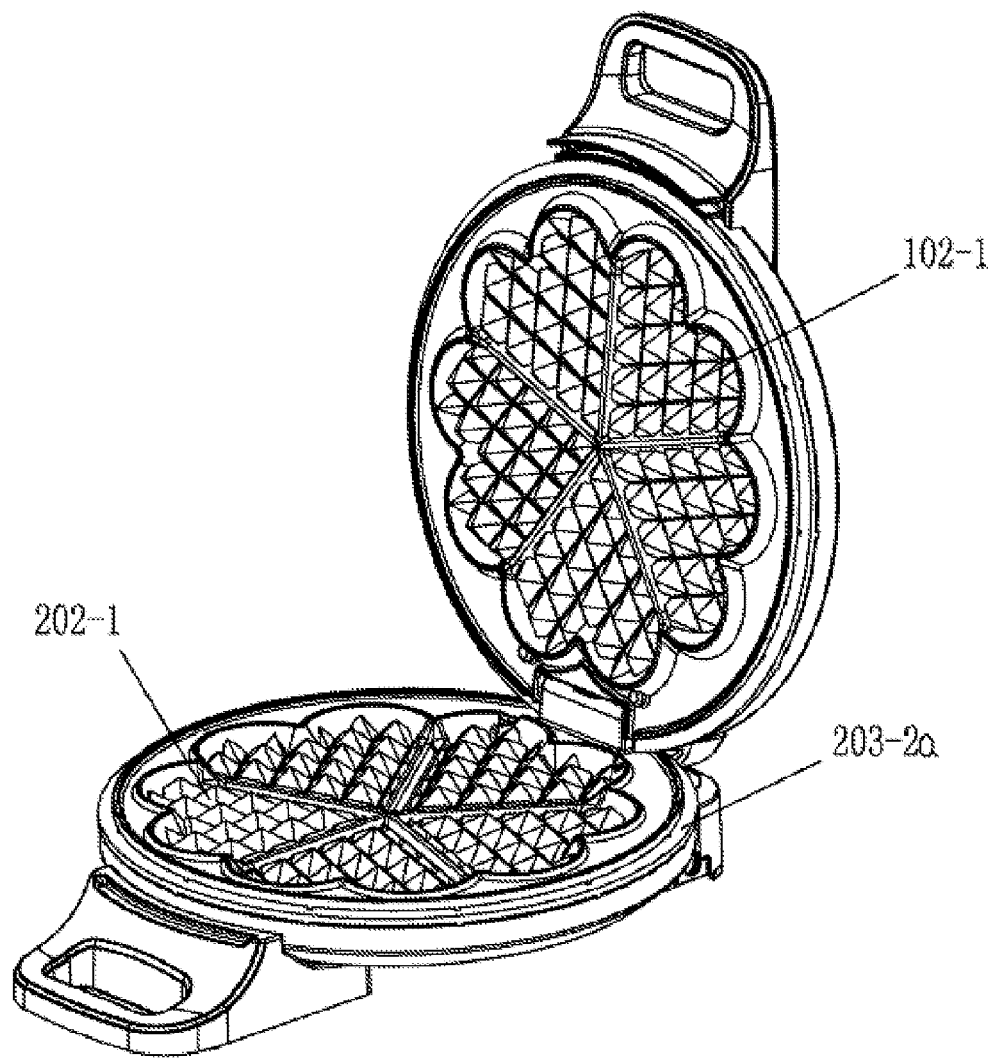
FIG. 3 is a perspective view of the apparatus of FIG. 1 in an open position.
Figure 4:
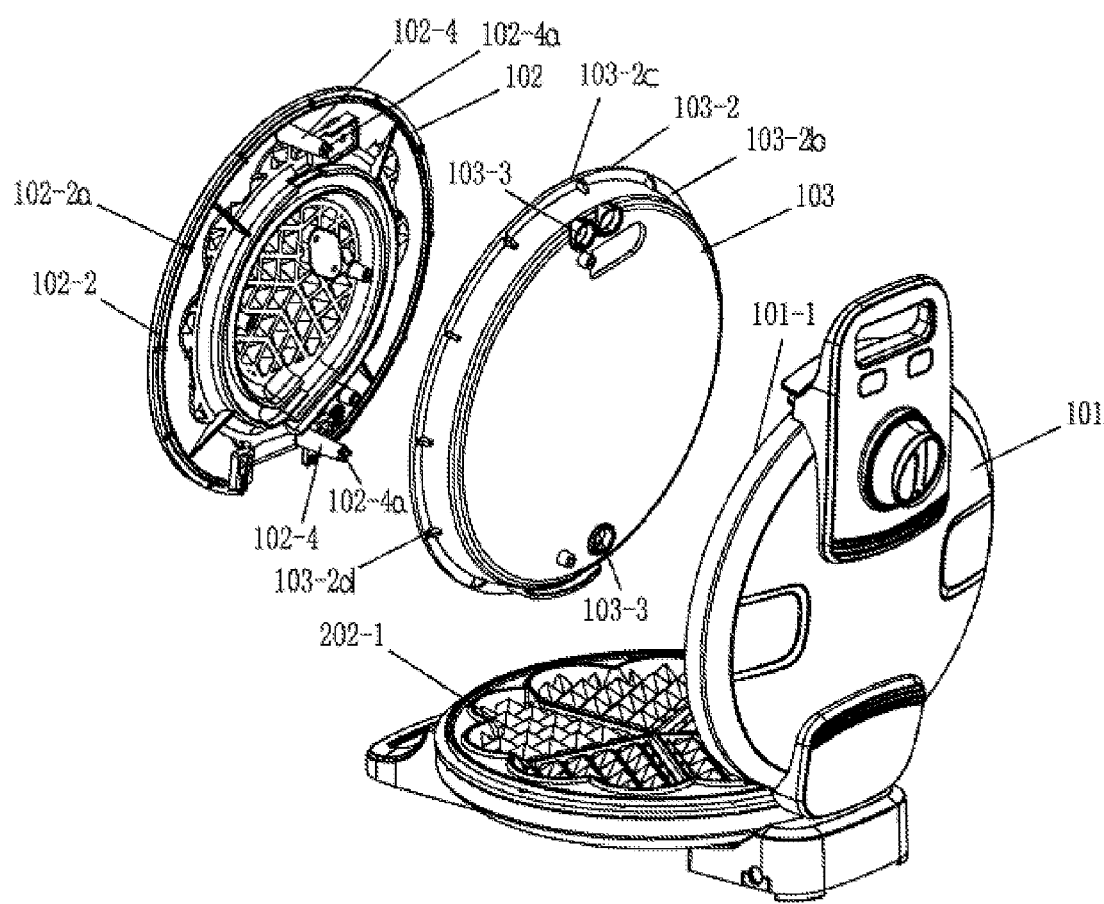
FIG. 4 is a rear perspective view of the apparatus of FIG. 1 showing the upper half of the apparatus in exploded view.
Figure 5:
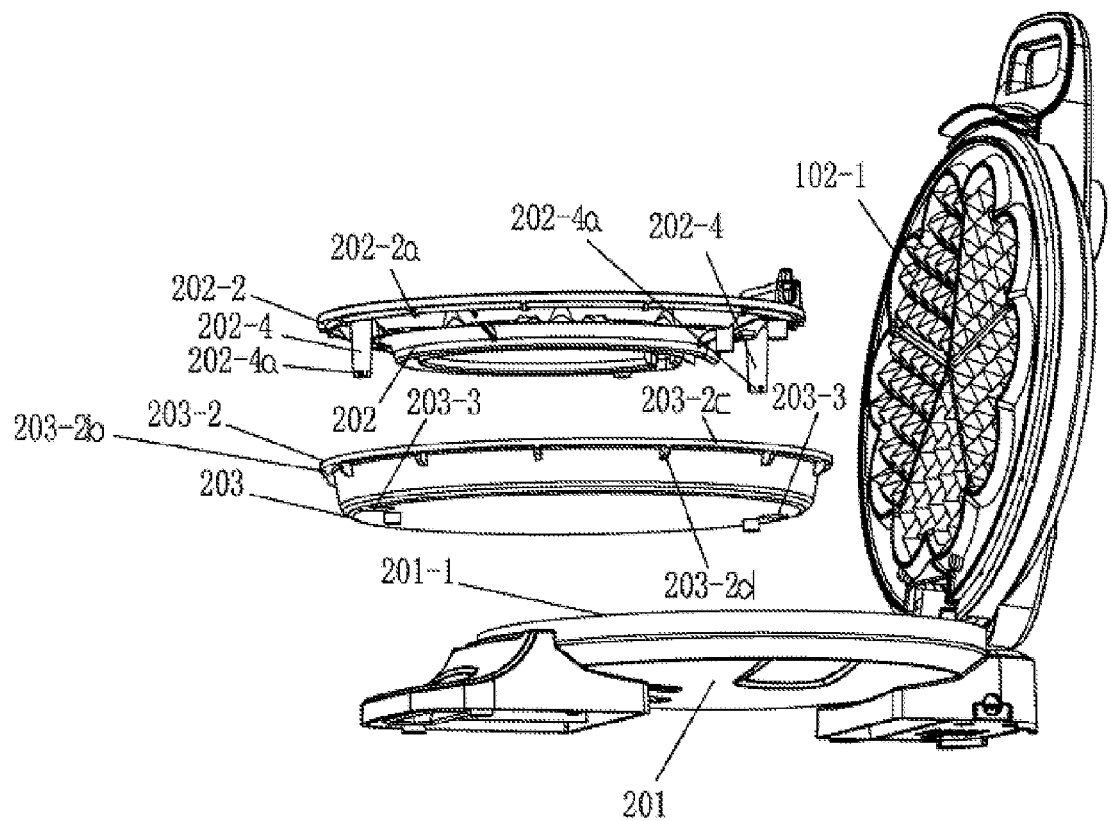
FIG. 5 is a perspective view of the apparatus of FIG. 1 showing the lower half of the apparatus in exploded view.
Figure 6:
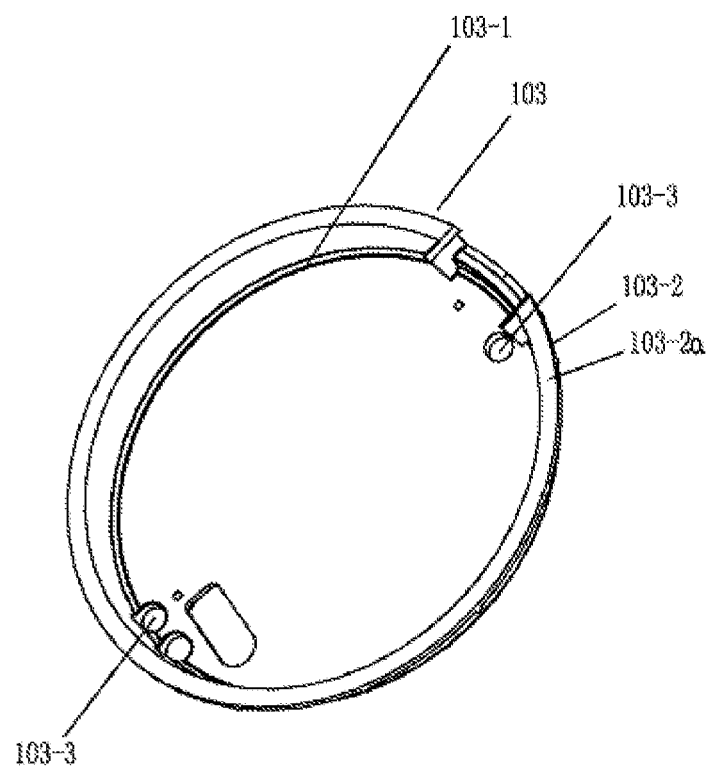
FIG. 6 is a perspective view of an upper heat-insulating housing of the apparatus of FIG. 1.
Figure 7:
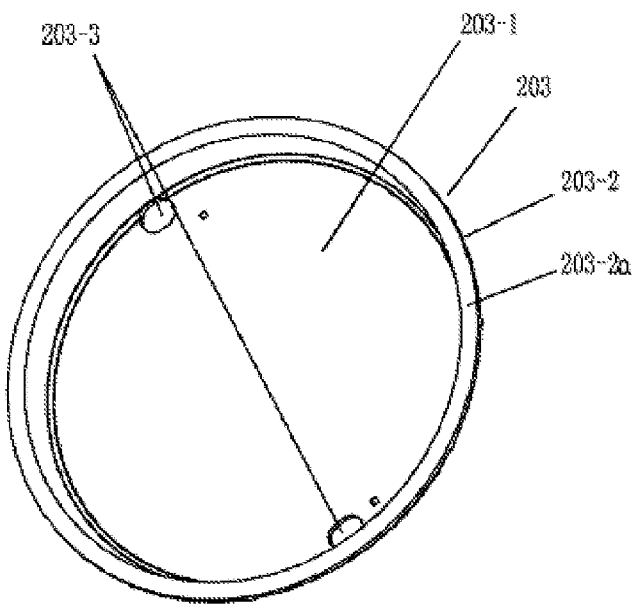
FIG. 7 is a perspective view of an lower heat-insulating housing of the apparatus of FIG. 1.

Below with the accompanying drawings, an illustrative embodiment of the present invention is further described. As shown in FIGS. 1 to 8 An electric waffle maker or steak grill, includes upper and lower baking bodies 1, 2 that are connected by a hinge and movable between open and closed positions. Bodies 1, 2 preferably are generally circular and comprise upper and lower heating plates 102, 202 mounted on the corresponding upper and lower metal housings 101, 201. Heating plates 102, 202 preferably are heated by electrical resistance and provide a hot baking or grilling surface 102-1, 202-1, which may be flat and smooth or have a waffled surface, the former preferred for a steak or sandwich grill, the latter for a waffle maker. Heating plates 102, 202 preferably are molded or cast or otherwise integrally formed of aluminum or copper.

Upper and lower heating plates 102, 202 are respectively embedded or received in cavities 103-1, 203-1 in disk-shaped, non-metallic upper and lower heat-insulating casings or housings 103, 203, which are in turn received in upper and lower metal housings 101, 201, respectively. An outwardly turned lip or support platform 103-2, 203-2 at the periphery of each casing forms a bearing surface 103-2a, 203-2a, that engages the outer periphery of the metal housings 101, 201 and heating plates 102, 202. Heat-insulating casings 103, 203 reduce heat radiation from heating plates 102, 202 to housings 101, 201, thereby reducing the temperature of the casings to safe and acceptable temperatures. The outermost diameter or periphery of each of heat-insulating casing 103, 203 (outwardly turned lips 103-2, 203-2) exceeds the outermost diameter of heating plates 102, 202 by about 5 mm, preventing a user's hand or fingers from easily contacting the heating plates and aiding in compliance with European GS standard 603335-2-9 (A13 of character plus EK1) temperature requirements. Casings 103, 203 preferably are molded or integrally formed of bakelite, plastic, or ceramic material having good mechanical strength and heat-insulating properties.

A plurality of first support ribs 102-2a, 202-2a, are circumferentially spaced about the periphery of each of the upper and lower heating plates 102, 202. First support ribs 102-2a, 202-2a are arranged such that the support surfaces 103-2a, 203-2a of the upper and lower heat-insulating casings 103, 203 are maintained in a spaced-apart relation to define a first cooling gap 3, 4 between the plates and casings. The cooling gaps 3, 4 permit convective heat transfer between the exterior of the appliance and the space between heating plates 102, 202 and heat-insulating casings 103, 203, thus providing additional cooling. Further, the "point contacts" between ribs 102-2a, 202-2a and casings 103, 203 reduce conductive heat transfer between them, while the air gap reduces radiative transfer.

A plurality of second support ribs 103-2d, 203-2d, are circumferentially spaced about the periphery of upper and lower insulating casings 103, 203 and maintain a spaced-apart relation between the casings and the upper and lower metal housings 101, 201 to define second cooling gaps 5, 6. As with the first cooling gaps 3, 4, conductive and radiative heat transfer between casings 103, 203 and housings 101, 201 are reduced, while convection is established between the space and exterior, thereby preventing excessive heating of bodies 101, 201.

The first and second supporting ribs 102-2a, 202-2a, 103-2d, 203-2d may be rectangular or triangular in cross section or arc-shaped as required to improve product flexibility. First and second supporting ribs 102-2a, 202-2a, 103-2d, 203-2d may have a width and height of about 1 mm-2 mm.

Housings 101, 201, casings 103, 203, and heating plates 102, 202 preferably are dimensioned such that when the upper and lower bodies 1, 2 are in the closed position, the vertical space (A in FIG. 2) between the outwardly turned lips 103-2, 203-2 of the heat-insulating casings 103, 203 (the outermost diameter of the appliance) is about 8-10 mm.

Figure 8:
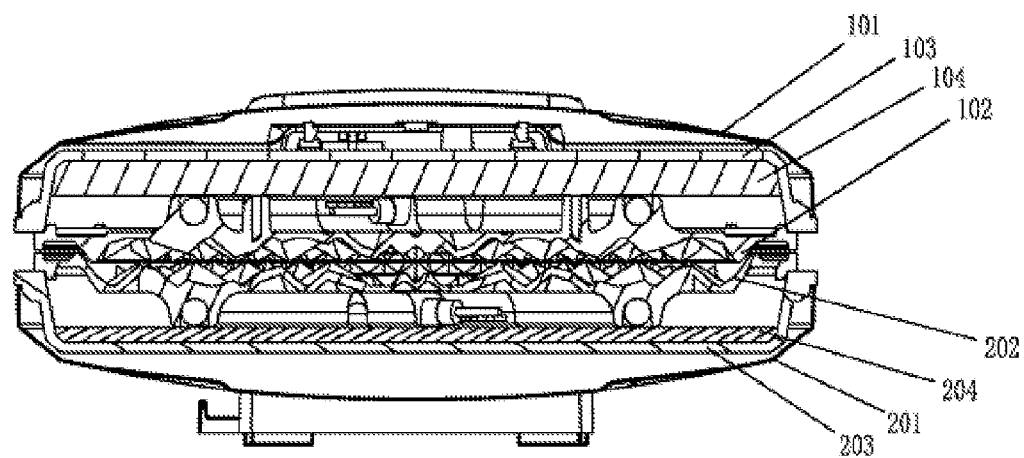
FIG. 8 is a front elevation view, partially in section, of the apparatus of FIG. 1.

Upper and lower fiber insulation pads 104, 204, as shown in FIG. 8, may be provided between heating plates 102, 202 and heat-insulating casings 103, 203 to further isolate the upper and lower heating plates 102, 202, from upper and lower metal housings 101, 201

A pair of mounting or positioning columns 102-4, 202-4 extend upwardly from the reverse surface of each of the upper and lower heating plates 102, 202. Columns 102-4, 202-4 extend through corresponding positioning sleeve holes 103-3, 203-3 in casings 103, 203, and their ends 102-4a, 202-4a are connected to the upper and lower metal housings 101, 201 with screws or other fasteners. This eases assembly and prevents relative rotation between the components.

The invention has been described with reference to preferred and illustrative embodiments thereof, it is thus not limited, but it susceptible to variation and modification without departing from the scope of the invention.

I claim:
1. An electric waffle maker or steak grill comprises:
upper and lower bodies connected by a hinge and movable between open and closed positions, each of the bodies having an outermost periphery;
upper and lower nonmetallic heat-insulating casings received in cavities in the upper and lower bodies, respectively, each of the heat-insulating casings having an outwardly turned lip that extends outwardly beyond the outermost periphery of each of the bodies;
upper and lower heating plates carried in the upper and lower heat-insulating casings, respectively, wherein the upper and lower heating plates oppose one another in the closed position, each of the heating plates having a peripheral edge supported by the outwardly turned lip on each of the heat-insulating casings, the peripheral edge of each heating plate being inward of the outermost periphery of each body; and
a plurality of support ribs arranged around the peripheral edges of each of the heating plates, the support ribs maintaining the peripheral edges of the heating plates and the outwardly turned lips of the heat-insulating casings in a spaced-apart relation, wherein a first cooling gap is defined between each of the heat-insulating casings and each of the heating plates.

2. The apparatus of claim 1, wherein a plurality of second support ribs are arranged about the outwardly turned lips of each of the heat-insulating casings, the second support ribs maintaining each of the heat-insulating casings in a spaced-apart relation with the outermost periphery of each of the bodies, wherein a second cooling gap is defined between each of the heat-insulating casings and each of the bodies.

3. The apparatus of claim 1, wherein the heat-insulating casing is integrally formed of bakelite, plastic or ceramic material.

4. The apparatus of claim 1, wherein each of the upper and lower bodies, heat-insulating casings, and heating plates are generally circular and the outer diameter of the heat-insulating casings exceeds that of the heating plates by approximately 5 mm.

5. The apparatus of claim 1, wherein a distance A between the outwardly turned lips of the upper and lower heat-insulating casings in the closed position is about 8-10 mm.

6. The apparatus of claim 1, wherein the upper and lower heating plates are integrally formed of aluminum or copper.

7. The apparatus of claim 1, further comprising upper and lower fiber insulation pads between the heating plates and insulating casings, respectively.

8. The apparatus of claim 1, further comprising:
at least one mounting column extending from each of the heating plates; and
at least one positioning sleeve holes through each of the heat-insulating casings in a location corresponding to that of the mounting column, wherein, upon assembly, the mounting column extends through the positioning sleeve holes.

9. An electric waffle maker or steak grill comprises:
upper and lower bodies connected by a hinge and movable between open and closed positions, each of the bodies having an outermost periphery;
upper and lower nonmetallic heat-insulating casings received in cavities in the upper and lower bodies, respectively, each of the heat-insulating casings having an outwardly turned lip that extends outwardly beyond the outermost periphery of each of the bodies;
upper and lower heating plates carried in the upper and lower heat-insulating casings, respectively, wherein the upper and lower heating plates oppose one another in the closed position, each of the heating plates having a peripheral edge supported by the outwardly turned lip on each of the heat-insulating casings, the peripheral edge of each heating plate being inward of the outermost periphery of each body; and a plurality of support ribs are arranged about the outwardly turned lips of each of the heat-insulating casings, the support ribs maintaining each of the heat-insulating casings in a spaced-apart relation with the outermost periphery of each of the bodies, wherein a cooling gap is defined between each of the heat-insulating casings and each of the bodies.

10. The apparatus of claim 9, further comprising:
a plurality of second support ribs arranged around the peripheral edges of each of the heating plates, the second support ribs maintaining the peripheral edges of the heating plates and the outwardly turned lips of the heat-insulating casings in a spaced-apart relation, wherein a first cooling gap is defined between each of the heat-insulating casings and each of the heating plates.

11. The apparatus of claim 9, wherein the heat-insulating casing is integrally formed of bakelite, plastic or ceramic material.

12. The apparatus of claim 9, wherein each of the upper and lower bodies, heat-insulating casings, and heating plates are generally circular and the outer diameter of the heat-insulating casings exceeds that of the heating plates by approximately 5 mm.

13. The apparatus of claim 9, wherein a distance A between the outwardly turned lips of the upper and lower heat-insulating casings in the closed position is about 8-10 mm.

14. The apparatus of claim 9, wherein the upper and lower heating plates are integrally formed of aluminum or copper.

15. The apparatus of claim 9, further comprising upper and lower fiber insulation pads between the heating plates and insulating casings, respectively.

16. The apparatus of claim 9, further comprising:
at least one mounting column extending from each of the heating plates; and
at least one positioning sleeve holes through each of the heat-insulating casings in a location corresponding to that of the mounting column, wherein, upon assembly, the mounting column extends through the positioning sleeve holes.

17. An electric waffle maker or steak grill comprises:
upper and lower bodies connected by a hinge and movable between open and closed positions, each of the bodies having an outermost periphery;
upper and lower nonmetallic heat-insulating casings received in cavities in the upper and lower bodies, respectively, each of the heat-insulating casings having an outwardly turned lip that extends outwardly beyond the outermost periphery of each of the bodies;
upper and lower heating plates carried in the upper and lower heat-insulating casings, respectively, wherein the upper and lower heating plates oppose one another in the closed position, each of the heating plates having a peripheral edge supported by the outwardly turned lip on each of the heat-insulating casings, the peripheral edge of each heating plate being inward of the outermost periphery of each body;
at least one mounting column extending from each of the heating plates; and
at least one positioning sleeve holes through each of the heat-insulating casings in a location corresponding to that of the mounting column, wherein, upon assembly, the mounting column extends through the positioning sleeve holes.

18. The apparatus of claim 17, further comprising:
a plurality of support ribs arranged around the peripheral edges of each of the heating plates, the support ribs maintaining the peripheral edges of the heating plates and the outwardly turned lips of the heat-insulating casings in a spaced-apart relation, wherein a first cooling gap is defined between each of the heat-insulating casings and each of the heating plates.

19. The apparatus of claim 17, wherein a plurality of second support ribs are arranged about the outwardly turned lips of each of the heat-insulating casings, the second support ribs maintaining each of the heat-insulating casings in a spaced-apart relation with the outermost periphery of each of the bodies, wherein a second cooling gap is defined between each of the heat-insulating casings and each of the bodies.

20. The apparatus of claim 17, wherein the heat-insulating casing is integrally formed of bakelite, plastic or ceramic material.

21. The apparatus of claim 17, wherein each of the upper and lower bodies, heat-insulating casings, and heating plates are generally circular and the outer diameter of the heat-insulating casings exceeds that of the heating plates by approximately 5 mm.

22. The apparatus of claim 17, wherein a distance A between the outwardly turned lips of the upper and lower heat-insulating casings in the closed position is about 8-10 mm.

23. The apparatus of claim 17, wherein the upper and lower heating plates are integrally formed of aluminum or copper.

24. The apparatus of claim 17, further comprising upper and lower fiber insulation pads between the heating plates and insulating casings, respectively.

25. An electric waffle maker or steak grill comprises:
upper and lower bodies connected by a hinge and movable between open and closed positions, each of the bodies having an outermost periphery;
upper and lower nonmetallic heat-insulating casings received in cavities in the upper and lower bodies, respectively, each of the heat-insulating casings having an outwardly turned lip that extends outwardly beyond the outermost periphery of each of the bodies, the heat-insulating casings maintained in spaced-apart relation with the bodies, wherein a first cooling gap is defined between the heat-insulating casings and the bodies; and
upper and lower heating plates carried in the upper and lower heat-insulating casings, respectively, wherein the upper and lower heating plates oppose one another in the closed position, each of the heating plates having a peripheral edge supported by the outwardly turned lip on each of the heat-insulating casings, the peripheral edge of each heating plate being inward of the outermost periphery of each body, the heating plates and the outwardly turned lips of the heat-insulating casings maintained in a spaced-apart relation, wherein a second cooling gap is defined between each of the heat-insulating casings and each of the heating plates.

26. The apparatus of claim 25, further comprising:
a plurality of support ribs arranged around the peripheral edges of each of the heating plates, the support ribs maintaining the peripheral edges of the heating plates and the outwardly turned lips of the heat-insulating casings in a spaced-apart relation, wherein the first cooling gap is defined between each of the heat-insulating casings and each of the heating plates.

27. The apparatus of claim 25, wherein a plurality of second support ribs are arranged about the outwardly turned lips of each of the heat-insulating casings, the second support ribs maintaining each of the heat-insulating casings in a spaced-apart relation with the outermost periphery of each of the bodies, wherein the second cooling gap is defined between each of the heat-insulating casings and each of the bodies.

28. The apparatus of claim 25, wherein the heat-insulating casing is integrally formed of bakelite, plastic or ceramic material.

29. The apparatus of claim 25, wherein each of the upper and lower bodies, heat-insulating casings, and heating plates are generally circular and the outer diameter of the heat-insulating casings exceeds that of the heating plates by approximately 5 mm.

30. The apparatus of claim 25, wherein a distance A between the outwardly turned lips of the upper and lower heat-insulating casings in the closed position is about 8-10 mm.

31. The apparatus of claim 25, wherein the upper and lower heating plates are integrally formed of aluminum or copper.

32. The apparatus of claim 25, further comprising upper and lower fiber insulation pads between the heating plates and insulating casings, respectively.

33. The apparatus of claim 25, further comprising:
 at least one mounting column extending from each of the heating plates; and
 at least one positioning sleeve holes through each of the heat-insulating casings in a location corresponding to that of the mounting column, wherein, upon assembly, the mounting column extends through the positioning sleeve holes.

\* \* \* \* \*